United States Patent
Perez-Loya et al.

(10) Patent No.: US 12,483,172 B2
(45) Date of Patent: Nov. 25, 2025

(54) CONCENTRATED-WINDING ELECTRICAL MACHINES WITH FLOATING EXCITER

(71) Applicant: Magström AB, Uppsala (SE)

(72) Inventors: José Perez-Loya, Uppsala (SE); Johan Abrahamsson, Uppsala (SE); Urban Lundin, Uppsala (SE)

(73) Assignee: Magstöm AB, Uppsala (SE)

( * ) Notice: Subject to any disclaimer, the term of this patent is extended or adjusted under 35 U.S.C. 154(b) by 171 days.

(21) Appl. No.: 18/686,541

(22) PCT Filed: Aug. 25, 2022

(86) PCT No.: PCT/SE2022/050762
§ 371 (c)(1),
(2) Date: Feb. 26, 2024

(87) PCT Pub. No.: WO2023/027622
PCT Pub. Date: Mar. 2, 2023

(65) Prior Publication Data
US 2024/0380347 A1    Nov. 14, 2024

(30) Foreign Application Priority Data
Aug. 27, 2021   (SE) .................... 2151024-3

(51) Int. Cl.
*H02P 27/08*    (2006.01)
*H02P 23/00*    (2016.01)

(52) U.S. Cl.
CPC .................... *H02P 23/00* (2013.01)

(58) Field of Classification Search
CPC .......... H02P 23/00; H02P 29/40; H02P 29/50; H02P 21/12; H02K 7/04
See application file for complete search history.

(56) References Cited

U.S. PATENT DOCUMENTS 7,456,537 B1   11/2008   Kascak et al.
8,378,541 B2   2/2013    Vollmer
(Continued)

FOREIGN PATENT DOCUMENTS

EP   3314733 B1   7/2020
EP   3457545 B1   7/2021
(Continued)

OTHER PUBLICATIONS

Supplementary European Search Report for EP22861796 that claims priority to the same parent application as the instant application; May 23, 2025; 3 pages.
(Continued)

*Primary Examiner* — Muhammad S Islam
(74) *Attorney, Agent, or Firm* — Harness, Dickey & Pierce, P.L.C.; Anthony G. Fussner (57) ABSTRACT

A magnetic flux control system (41) for controlling the magnetic flux in an electrical machine (1) with concentrated windings (22A-C) has at least one magnetic balancing power supply (51A-C), at least one balancing-current controller (61A-C) and electrical connections (71) configured to permit the connection of the balancing-current controller(s) over a segment (23) of the concentrated windings. The balancing power supply provides galvanicisolation. The magnetic balancing system has further at least one sensor (75) configured to measure a parameter associated with a magnetic flux, a force, a position, vibrations, voltages, and/or currents. The balancing-current controller(s) (61A-C) is(are) connected to the sensor(s) and is(are) powered by the balancing power supply(supplies). The balancing-current controller is configured to control an output current in dependence of a signal representing the measured parameter of the sensor(s). A winding excitation arrangement, an (Continued)

electrical machine and a method for balancing are also disclosed.

20 Claims, 7 Drawing Sheets

(56) References Cited

U.S. PATENT DOCUMENTS

| | | | |
|---|---|---|---|
| 10,044,307 B2 | 8/2018 | Lundin et al. | |
| 2005/0077793 A1 | 4/2005 | Garvey et al. | |
| 2007/0216244 A1 | 9/2007 | Edelson | |
| 2017/0222583 A1* | 8/2017 | Akimatsu | H02P 27/08 |
| 2018/0180095 A1 | 6/2018 | Jastrzebski et al. | |
| 2018/0183298 A1 | 6/2018 | Severson | |
| 2019/0356260 A1 | 11/2019 | Severson | |

FOREIGN PATENT DOCUMENTS

| | | |
|---|---|---|
| JP | 3753505 B2 | 3/2006 |
| WO | WO-2018/108353 A1 | 6/2018 |

OTHER PUBLICATIONS

Akira Chiba et al: "A Novel Middle-Point-Current-Injection-Type Bearingless PM Synchronous Motor for Vibration Suppression", IEEE Transactions on Industry Applications, IEEE Service Center, vol. 47, No. 4, Jul. 1, 2011, pp. 1700-1706.

PCT International Search Report and Written Opinion for PCT/SE2022/050762 that is the parent application to the instant application; dated Sep. 16, 2022; 8 pages.

* cited by examiner

CONCENTRATED-WINDING ELECTRICAL MACHINES WITH FLOATING EXCITER

This patent application is a U.S. national stage filing under 35 U.S.C. § 371 of PCT International Application No. PCT/SE2022/050762 filed Aug. 25, 2022 (published as WO 2023/027622 on Mar. 2, 2023), which claims priority to and the benefit of Swedish Application No. 2151024-3 filed Aug. 27, 2021. The entire contents of these applications are incorporated herein by reference.

TECHNICAL FIELD

The present invention relates in general to electrical machines and in particular to concentrated-winding electrical machines.

BACKGROUND

A rotating machine comprises in general a stator and a rotor. The rotor is configured for rotating with respect to the stator, and different forces will thereby be acting between the rotor and the stator. Some of the forces, typically mechanical forces, are due to loads or force applications on the rotating shaft. However, also other forces, e.g. magnetic forces, exist because of non-perfect rotor and/or stator configurations, e.g. irregular rotor/stator shape and/or shaft misalignment. Different kinds of bearings are commonly used for carrying such forces. Rotating machines typically have both radial and axial bearings, of which either or both may be of a contact free type.

In the US patent publication U.S. Pat. No. 10,044,307 B2, an arrangement and method for force compensation in electrical machines is disclosed. An electrical machine comprises a rotor, a stator, a rotor power supply, at least one sensor and a rotor magnetization control arrangement. The rotor has rotor windings for controlling magnetization of rotor magnetic poles. The sensor is arranged to measure a parameter associated with a relative force between the stator and the rotor, e.g. by use of a strain gauge, a vibration gauge or a magnetic flux sensor. The rotor magnetization control arrangement is communicationally connected to the sensor for receiving a signal representing the measured parameter. The rotor magnetic poles are divided into at least two groups. The rotor magnetization control arrangement is arranged for controlling the magnetization of the groups individually by providing a respective individually controllable rotor current in dependence of the signal representing the measured parameter.

This solution has proved to operate very well in practice and a pilot installation in a 10 MW generator with 800 A field current has recently been running without any problem for more than 2000 hours. Construction and manufacturing of new electrical machines according to these concepts are therefore assumed to be very competitive.

However, some disadvantages do exist if this technology is to be applied on already existing equipment, e.g. as a refurbishment. The mechanical reconstruction or adaptation may be relatively extensive with respect to both cost and time. Furthermore, the technology also has to be integrated into the existing voltage regulation system, which may be difficult.

Other approaches within this technical field are also known. In the published patent application US 2005/0077793 A1, a rotational electrical machine having capability to generate lateral forces is disclosed. A stator and rotor are separated by an air gap in which magnetic fields act both to exert torque and lateral forces. A set of windings is present on the stator and/or rotor and this set of winding is used to generate a distribution of flux having two parts. A first part serves to produce torque and the second part serves to produce a net lateral force. This machine uses the physical connection of the coils within the phases of the machine such that separate sources can be used for supplying currents for generating torque and lateral forces independently using a bridge concept. The voltage and current ratings of the supply used for generating the lateral forces can both be substantially lower than the corresponding ratings of the supply used for generating the torque. However, such a solution requires special windings in the stator. Since the stator in large machines often operates at high voltages, such windings are difficult to add in a retrofit.

In the US patent publication U.S. Pat. No. 8,378,541 B2, a magnetic radial bearing and a magnetic bearing system having a three-phase controller are disclosed. The bearing has a number of electromagnets circumferentially arranged around a rotating shaft. Each of the electromagnets has a coil which is electrically connected so as to generate both a magnetic bias and a rotating three-phase field. First terminals of opposing coils are connected in common to a corresponding phase of a three-phase controller for generating the rotating field, whereas second terminals of the coils not connected to the same phase are connected at corresponding star points. The star points are connected to DC power for generating the magnetic bias. This approach is essentially only intended for radial magnetic bearing machines. Since opposite windings receive control current from one phase of the three-phase inverter, it is difficult to ensure that the exact required current flows when desired. This is merely a compromise between reducing the power electronics in exchange for accuracy.

In the published international patent application WO 2018/108353 A1, an excitation system for a synchronous machine is disclosed. An excitation system for a synchronous machine comprises a plurality of coil groups connected to each other, forming a field winding of a rotor of a synchronous machine. The excitation system further comprises a plurality of energy storage devices, each comprising a respective energy storage unit. Each energy storage device is connected to a respective coil group and each energy storage device is configured to be fed with a dc magnetizing current. Each energy storage device is configured to be controlled to set the amount of charging of the corresponding energy storage unit by the dc magnetizing current. Thereby, individual control of the amount of energy in the respective coil group is provided. However, the energy storage unit of such an approach may become extremely large. Furthermore, the storage unit is intended to be installed on a rotating shaft whereby the available arrangements have to withstand the rotation. Moreover, rotor defects, such as e.g. eccentricities, cannot be compensated since it requires a constant outflow of energy from the energy storage device.

SUMMARY

A general object with the present technology is to provide a magnetic flux-control system for a rotating electrical machine that is independent of the operation of the magnetization system and compensates for rotor and stator air gap shape deviations.

The above object is achieved by methods and devices according to the independent claims. Preferred embodiments are defined in dependent claims.

In general words, in a first aspect, a magnetic flux control system for controlling the magnetic flux in an electrical machine with concentrated windings is presented. All concentrated windings are connected in series and supplied by a common main power supply. The magnetic flux control system has at least one magnetic balancing power supply and at least one balancing-current controller, powered by a respective one of said at least one balancing power supply. The magnetic flux control system has further electrical connections configured to permit the connection of an output of the balancing-current controller(s) over a segment of the concentrated windings. The segment is less than the entirety of the concentrated windings. The balancing power supply (supplies) provides galvanic isolation. The magnetic balancing system has further at least one sensor. The sensor(s) is(are) configured to measure a parameter associated with a magnetic flux in an airgap between a stator and a rotor of the electrical machine in connection with the concentrated windings, a force between the rotor and the stator, a position of a shaft of the rotor relative the stator, vibrations in the rotor, vibrations in the stator, acoustic noise generated by the electrical machine, voltages generated by or supplied to the electrical machine, and/or currents generated by or supplied to the electrical machine. The balancing-current controller is connected to the sensor(s). The balancing-current controller(s) is(are) configured to control a current, powered by the balancing power supply (supplies), in dependence of a signal representing the measured parameter of the sensor(s).

In a second aspect, a winding excitation arrangement for an electrical machine with concentrated windings, all connected in series, comprises a main power supply, main electrical connections, and a main controller. The main electrical connections are configured to permit the connection of the main controller to the concentrated windings. The main controller is configured for controlling an output from the main power supply. The winding excitation arrangement further comprises a magnetic flux control system according to the first aspect.

In a third aspect, an electrical machine comprises a rotor, a stator, and concentrated windings connected in series. The electrical machine further comprises a winding excitation arrangement according to the second aspect.

In a fourth aspect, a method for controlling the magnetic flux in an electrical machine with concentrated windings, all connected in series and supplied by a common main power supply, comprises rotating of a rotor of the electrical machine relative a stator of the electrical machine. A current supplied via a main controller through the serially connected concentrated windings is controlled. A quantity is measured. This measured quantity is associated with a flux in an airgap between a stator and a rotor of the electrical machine in connection with the concentrated windings, a force between the rotor and the stator, a position of a shaft of the rotor relative the stator, vibrations in the rotor, vibrations in the stator, acoustic noise generated by the electrical machine, voltages generated by or supplied to the electrical machine, and/or currents generated by or supplied to the electrical machine. At least one current supplied through a segment of the concentrated windings is controlled in dependence of the measured quantity, powered from a galvanically isolated magnetic balancing power supply. The segment is less than the entire concentrated windings.

One advantage with the proposed technology is that it can co-exist with existing magnetization systems but operates independently. There is thus no need to modify the existing magnetization system or automated voltage regulation. Other advantages will be appreciated when reading the detailed description.

BRIEF DESCRIPTION OF THE DRAWINGS

The invention, together with further objects and advantages thereof, may best be understood by referring to the following description taken together with the accompanying drawings, in which.

DETAILED DESCRIPTION

Throughout the drawings, the same reference numbers are used for similar or corresponding elements.

For a better understanding of the proposed technology, it may be useful to begin with a short discussion of field currents in rotating electrical machines. In a perfectly shaped rotor positioned perfectly concentrically relative to a perfectly shaped stator and without any gravity influences, a constant field current (bias current) conducted through the concentrated windings will give rise to a constant magnetic flux (bias flux) allowing the operation of the electrical machine. Due to the perfect shape and position, the amplitude of magnetic flux in the airgap will be time independent.

However, in a real equipment with inherent imperfections, the situation is different. A constant field current will in most cases give rise to magnetic fluxes that can maintain the operation of the electrical machine. However, displacements from the concentric position as well as shape deviations will result in asymmetries in the magnetic flux, which will cause net forces between rotor and stator-both static and time-varying. These forces together with external forces, such as gravity, will be transmitted by bearings, and will cause vibrations in the system, resulting in undesired noise and wear.

Some rotating electrical machines utilize a principle based on that an additional flux is added onto the normal bias flux. Additional windings that enable the provision of different fluxes to different parts of the electrical machine can be applied, or the field currents may be adapted to counteract varying forces around the electrical machine. Such a field current adaptation can be expressed as:

$$I_f = I_f^0 + \Delta I_f^{ecc} \sin(\omega t + \phi),\qquad(1)$$

where $I_f^0$ denotes the bias flux current and $\Delta I_f^{ecc}$ is the amplitude of the additional flux current for compensation of an eccentric magnetic configuration. A current supply arrangement arranged for being capable of providing such a flux current must be able to provide both a high bias current and a fast-varying balancing current contribution. A motor having a bias field current of 800 A and having an eccentricity of 2% needs to be able to control variations of ±20 A with high frequency. As mentioned in the background section, this is indeed feasible, but requires typically modifications of the entire basic current-supplying system.

However, since the balancing-contributing parts of the field current typically are small compared to the bias field current, a division of the current supply in two parts would be beneficial, where a first part delivers a relatively high, but constant, field current and a second part delivers a relatively low, but varying, balancing-current. For one pole of an electrical machine, it can be expressed as:

$$I_f = I_f^{const} + I_f^{balance}(t)\qquad(2)$$

If a bidirectional balancing-current controller is available, the division can e.g. be made according to:

$$I_f^{const} = I_f^0\qquad(3A)$$

$$I_f^{balance}(t) = \Delta I_f^{ecc}\sin(\omega t + \phi).\qquad(3B)$$

In other words, a varying part of the field current is supplied by one or more balancing-current controller, whereas a constant part of the field current is supplied by a main field current supply. Typically, the main field current supply is responsible for 90-95% of the current for providing magnetization, whereas the balancing-current controller typically may provide 5-10% of the necessary current. Since all time-varying currents are provided by the low-current supply, less complex equipment may be utilized for the balancing-current controller as well as for the main field current power supply. Furthermore, since the main field current is the same for all poles in a machine, a common main field current supply can be used for all poles.

A similar division is also possible using a unidirectional balancing-current controller by using a somewhat different division:

$$I_f^{const} = I_f^0 - I_0\qquad(4A)$$

$$I_f^{balance}(t) = I_0 + \Delta I_f^{ecc}\sin(\omega t + \phi),\qquad(4B)$$

where $$I_0 \geq \Delta I_f^{ecc}.\qquad(4C)$$

Of course, a bidirectional balancing-current controller can also be utilized for all $I_0$, e.g. for $I_0 < \Delta I_f^{ecc}$.

These ideas are implemented in a beneficial manner by some arrangements at the electrical machine. All windings may be connected in series, being powered by a common main field current supply. Balancing-current supplies are to be arranged for adapting the field currents for the different windings and therefore have to be connected at pole interconnections. Furthermore, the balancing-current supplies must be galvanically insulated from each other and from the common main field current supply.

Each balancing-current controller must be controlled individually, to provide balancing currents of suitable size and timing. For this reason, a quantity associated with the required balancing current must be measured and the balancing-current control has to be based on such a measured quantity in order to compensate for imperfections in the electrical machine. The quantity associated with the required balancing current can e.g. be the magnetic flux in an airgap between a stator and a rotor, the force between the rotor and the stator, the position of a shaft of the rotor relative the stator, vibrations in the rotor, vibrations in the stator, acoustic noise generated by the electrical machine, voltages generated by or supplied to the electrical machine, and/or currents generated by or supplied to the electrical machine.

Such an approach of a magnetic flux control system has many advantages. The magnetic flux control system can co-exist with existing magnetization systems but may be operated independently. When retrofitting is made, there is no need to modify existing magnetization systems or AVRs (Automatic Voltage Regulators). An installation of such a retrofitting is thus much simpler and less intrusive compared to other alternatives within the prior art. Also, if retrofitting is made, but the magnetic flux control system fails, the original electrical machine system is not harmed and may continue operation, but without magnetic flux balancing.

At the same time, such an approach has most of the benefits of other magnetic flux control systems. If desired, all unbalanced magnetic forces, both static and dynamic, are removed. In other words, the electrical machine is magnetically balanced. Furthermore, it reduces losses in parallel stator circuits and damper bars, which reduces thermal loading. However, in some cases, it may be desirable to achieve a defined magnetic state—for example one that generates a controllable magnetic force vector to counteract the force of gravity on the rotor of a horizontal machine, to have a predefined load on the guide bearings of a vertical machine, or to realize a radial magnetic bearing.

By basing the magnetic flux control on measured quantities, a continuous online monitoring system is available. The effects of a well operating flux control system remove most fatigue caused by oscillating forces on rotor components. It also reduces THD (Total Harmonic Distortion) by removing airgap flux irregularities.

Figure 1:
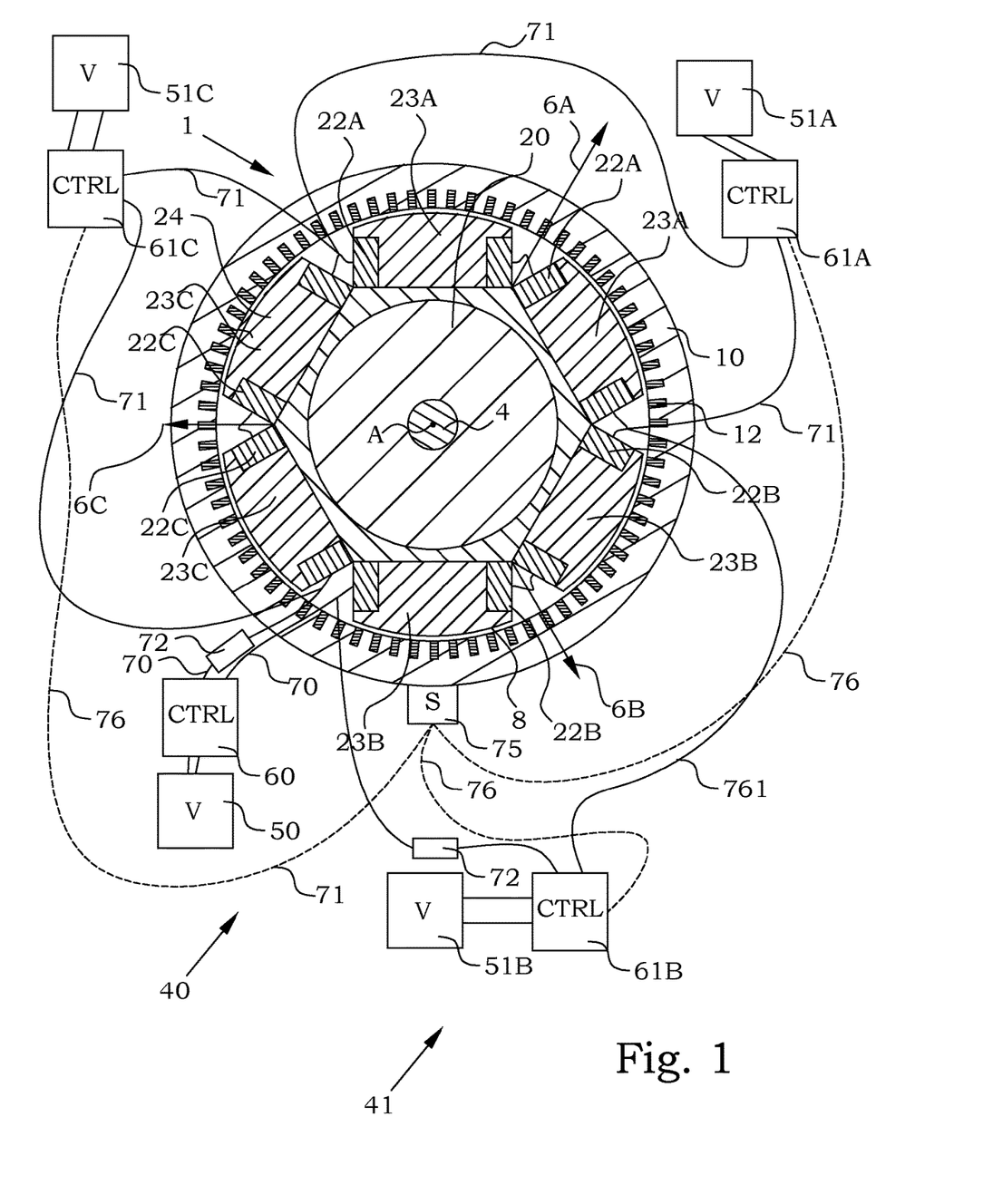
FIG. 1 illustrates a cross-sectional view of an embodiment of an electric machine.

FIG. 1 illustrates a cross-sectional view of an embodiment of an electric machine 1 utilizing rotor magnetic poles 24 that are electromagnetically excited. The electric machine 1 comprises a stator 10 with stator windings 12. A rotor 20 is provided on a shaft 4 and is rotatable relative the stator 10 around a rotational axis A. An airgap 8 is present between the rotor 20 and the stator 10. The term "airgap" is used here even in cases where the gap may be filled with other substances than air or vacuum. The rotor 20 of this embodiment has 6 rotor magnetic poles 24. The poles are magnetized by sending a current through concentrated rotor windings 22A-22C wound around the rotor magnetic poles 24. A main power supply 50 is arranged to supply the rotor windings 22A-22C with current, where the concentrated rotor windings 22A-22C are connected in series. A winding excitation arrangement 40 comprises a main controller 60 is configured for controlling an output from the main power supply 50 to the rotor windings 22A-22C through main electrical connections 70. The main electrical connections 70 are thus configured to permit the connection of the main controller 60 to the concentrated rotor windings 22A-22C. A ballast impedance 72 is connected in one of the connections 70, as will be discussed in further detail below. The magnetization current around the rotor magnetic poles 24 gives rise to a magnetic field which interacts over the airgap 8 with the stator 10. The interaction gives rise to a force and torque between each rotor magnetic pole 24 and the stator 10.

In the present disclosure, "concentrated windings" is used in the meaning of a solenoid-like winding, as opposed to a distributed winding involving several poles.

In this embodiment, the rotor magnetic poles 24 are divided into three segments 23A, 23B, 23C of rotor magnetic poles 24, each segment 23A, 23B, 23C of rotor magnetic poles having at least one rotor magnetic pole 24 and less than all rotor magnetic poles 24. The winding excitation arrangement 40 further comprises a magnetic flux control system 41. The magnetic flux control system 41 comprises at least one magnetic balancing power supply, in the present embodiment three magnetic balancing power supplies 51A-51C. Each magnetic balancing power supply 51A-51C is arranged to power a respective balancing-current controller 61A-61C, an output of which supply respective rotor windings 22A, 22B and 22C with current. Electrical connections 71 are configured to permit the connection of the output of the respective balancing-current controller 61A-61C over a segment of the concentrated rotor windings 22A, 22B and 22C. A ballast impedance 72 is connected in one of the connections 71, as will be discussed in further detail below. In other words, the currents from the balancing-current controller 61A-61C are provided in parallel to the main magnetization current over the respective segments. The balancing currents are controlled by a respective balancing-current controller 61A-61C, and powered by a respective magnetic balancing power supply 51A-51C. The magnetic flux control system 41 is arranged for controlling the magnetic flux of the three segments of rotor magnetic poles individually, whereas the main power supply provides the basic magnetization.

The rotor current passing through the rotor winding 22A controls the magnetization of the rotor magnetic poles of segment 23A. These rotor magnetic poles of segment 23A create a magnetic force relative to the stator 10. The net force from the rotor magnetic poles of segment 23A is illustrated as a segment force 6A. The rotor current passing through the rotor winding 22B controls the magnetization of the rotor magnetic poles of segment 23B. These rotor magnetic poles of segment 23B create a magnetic force relative to the stator 10. The net force from the rotor magnetic poles of segment 23B is illustrated as a segment force 6B. The rotor current passing through the rotor winding 22C controls the magnetization of the rotor magnetic poles of segment 23C. These rotor magnetic poles of segment 23C create a magnetic force relative to the stator 10. The magnetic poles are wound to create a magnetic field with alternating north and south poles in a circumferential direction. The net force from the rotor magnetic poles of segment 23C is illustrated as a segment force 6C. Since the segments 23A, 23B and 23C are grouped without any rotational symmetry relative the axis A within each segment, the segment forces 6A, 6B, 6C becomes non-zero. However, in this embodiment there is a rotational symmetry relative the axis A between the different segments. In other words, segment 23A is similar to segment 23B, rotated 120° around axis A and segment 23A is similar to segment 23C, rotated 240° around axis A.

Figure 2A:
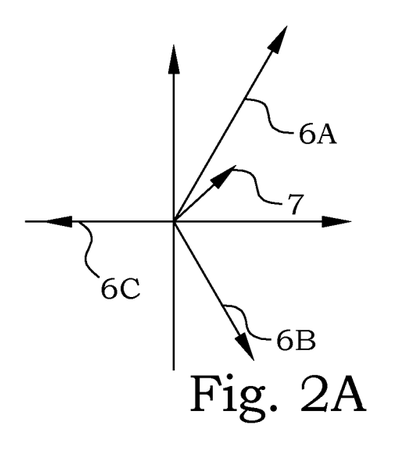
FIG. 2 illustrate diagrams of segment forces and compensation of such.

These segment forces 6A, 6B and 6C are illustrated in a diagram in FIG. 2A. By sending different currents to the different segments, the segment forces can be controlled to be different. The resultant magnetic force 7 thereby becomes different from zero.

Figure 2B:
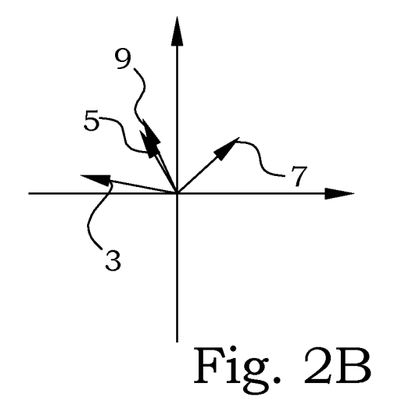

If the force between the rotor 20 and the stator 10 caused by other interactions than through the above-described rotor magnetic pole magnetization is known, the resultant magnetic force 7 can be used for controlling purposes. This is schematically illustrated in FIG. 2B. Forces caused by said other interactions is denoted by 3. A predetermined target force 5 is the goal of the control. The resultant magnetic force 7 can be controlled to give a resulting net force 9 that should be as close to the target force as possible. The target force 5 is in a typical case equal to zero, but there are applications where a non-zero predetermined target force 5 is requested. In an electrical machine having an eccentric rotor, magnetic forces are constantly acting on the rotor, and a target force can be designed to counteract such forces. Similarly, if a rotor field winding experiences an inter-turn short circuit, forces caused by this can be compensated.

To compensate for other forces acting on the rotor, such forces have to be known. To this end, at least one sensor 75 is provided, again with reference to FIG. 1. This sensor 75 is arranged to measure a parameter that is related to a relative force between the stator 10 and the rotor 20. Examples of such measured parameters can be e.g. magnetic flux in an airgap between a stator and a rotor of the electrical machine in connection with the concentrated windings, a force between the rotor and the stator, a position of a shaft of the rotor relative the stator, vibrations in the rotor, vibrations in the stator, acoustic noise generated by the electrical machine, voltages generated by or supplied to the electrical machine, and/or currents generated by or supplied to the electrical machine. Since parts being mechanically attached to the rotor or stator, respectively, experience force conditions that are proportional to the relative force between rotor and stator, such parts can also be used for the sensor. In other words, the sensor 75 may be arranged between a part of the stator or a part mechanically attached to the stator on one hand and a part of the rotor, or a part mechanically attached to the rotor on the other hand. The balancing-current controllers 61A-61C are communicationally connected, illustrated by the dotted line 76, to the sensor or sensors 75 for receiving a signal representing the measured parameter. The balancing-current controllers 61A-61C are arranged to control the respective balancing rotor currents in dependence of the signal representing the measured parameter of the sensor 75 or sensors. The balancing-current controllers 61A-61C may also have mutual communicational connections in order to cooperate in a close manner. Alternatively, all balancing-current controllers 61A-61C may be combined into one unit, capable of providing separate control of the different powers provided by the balancing power supplies 51A-51C into suitable currents in a galvanically isolated manner.

In a general case, the individual control of the rotor magnetization can be controlled to reach an acceptable resulting net force, e.g. within certain ranges, amplitudes, frequencies etc. In a preferred embodiment, the magnetic flux control system 41 may have a control functionality with a target. Since the magnetization of the rotor magnetic poles causes a respective magnetic force between the rotor magnetic poles and the stator which contribute to a resulting net force between the part of said stator or the part mechanically attached to the stator and the part of said rotor or the part mechanically attached to the rotor used for the sensor, a predetermined target force, larger than or equal to zero, can be created. The magnetic flux control system 41 is thereby arranged for directing the resulting net force towards the predetermined target.

In one embodiment the predetermined target force is zero. In such a case, the rotor magnetization control arrangement is arranged to supply the respective rotor currents to give a magnetic force between the rotor magnetic poles and the stator that minimizes the resulting net force.

Figure 3:
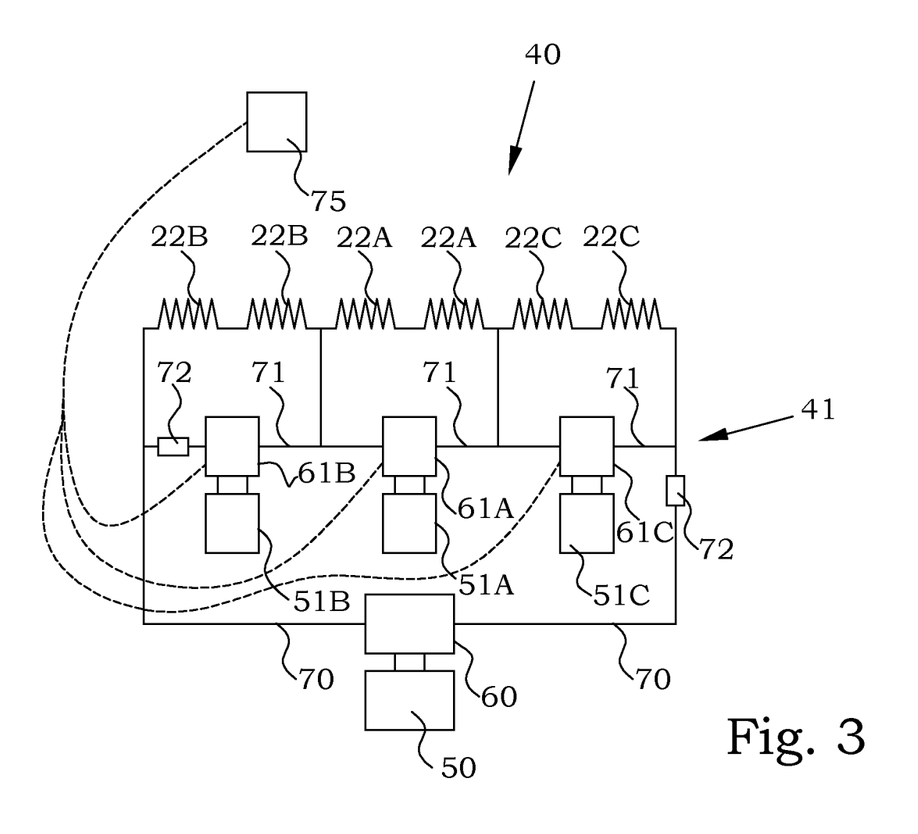
FIG. 3 illustrates an embodiment of a winding excitation arrangement.

FIG. 3 illustrates an embodiment of a winding excitation arrangement 40 for an electrical machine with concentrated windings 22A-22C, all connected in series. As discussed above, the winding excitation arrangement 40 comprises a main power supply 50, a main controller 60, configured for controlling an output from the main power supply 50 and main electrical connections 70 configured to permit the connection of the main controller 60 to the concentrated windings 22A-22C. The winding excitation arrangement 40 also comprises a magnetic flux control system 41.

Figure 4:
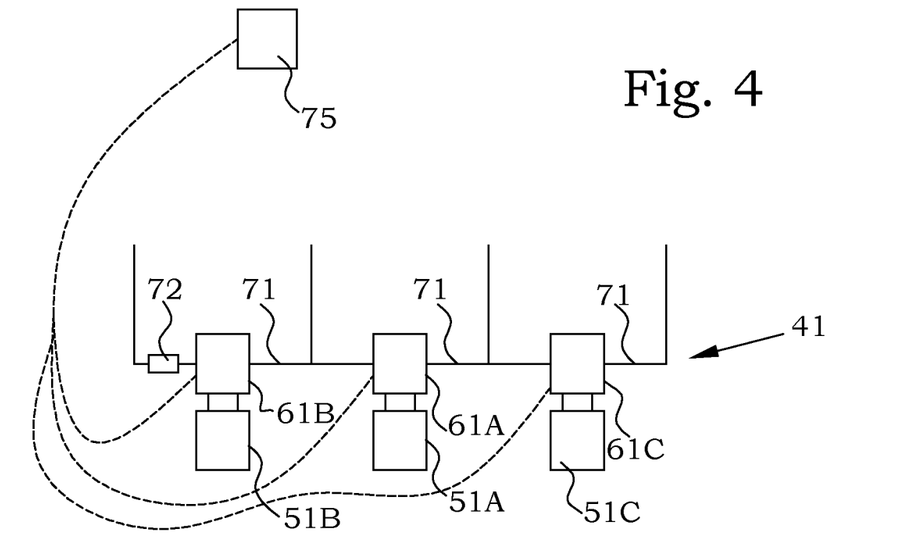
FIG. 4 illustrates an embodiment of a magnetic flux control system.

The magnetic flux control system 41 is extracted in FIG. 4. The magnetic flux control system 41 is intended for magnetically controlling the flux of an electrical machine with concentrated windings, all connected in series and supplied by a common main power supply. The magnetic flux control system 41 comprises at least one, and in this particular embodiment three, magnetic balancing-current controllers 60A-60C. Electrical connections 71 are configured to permit the connection of the output of the balancing-current controllers 60A-60C over a respective segment of the concentrated windings. The segments are less than the entire concentrated windings.

Each of the balancing power supplies 51A-51C provides galvanic isolation. At least one sensor 75 is configured to measure a parameter. The parameter is associated with a magnetic flux in an airgap between a stator and a rotor of the electrical machine in connection with the concentrated windings, a force between the rotor and the stator, a position of a shaft of the rotor relative the stator, vibrations in the rotor, vibrations in the stator, acoustic noise generated by the electrical machine, voltages generated by or supplied to the electrical machine, and/or currents generated by or supplied to the electrical machine. The balancing-current controllers 61A-61C are connected to the sensor(s) and are powered by the balancing power supplies 51A-51C. The balancing-current controller 61A-61C is configured to control a current, powered by the balancing-current supplies 51A-51C, in dependence of a signal representing the measured parameter of the sensor(s).

A ballast impedance 72 is included in at least one of the electrical connections 71 and/or in the connections 70 (FIG. 3) of the winding excitation arrangement 40. In other words, a ballast impedance 27 may be connected in series between at least one balancing-current controller 60A-60C and a segment 23A-23C. Alternatively or in combination, a ballast impedance may be connected in the winding excitation arrangement 40 in series with the concentrated windings 22A-22C. Such ballast impedance 72 limits the rate-of-change of the current from the balancing-current controller, which makes it possible to control the current in the segments separately from the current coming from the main power supply.

The above presented technology has many advantages. The magnetic flux control system can co-exist with previously existing magnetization systems but operates independently. This makes the solution extremely flexible and is thereby very suitable for retrofit installations. If a magnetic flux control system of this kind is to be added to an existing system, there is no need for modifying the already existing magnetization system or the AVR. There is also no requirement for the two systems to communicate.

Furthermore, if the present magnetic flux control system fitted onto a previously existing magnetization system would fail, such a failure would not create any harm to the components of the original magnetization system. The total system will in such a failure case anyway continue to operate according to previous operation routines, until a suitable occasion for repair may be found.

All these benefits are provided by an installation of additional equipment that is much simpler and less intrusive than previously proposed solution.

The balancing properties are at the same time at least as good as for prior-art solutions. As discussed further above, the possibilities to control the magnetization by the presently proposed magnetic flux control system enables removing of all unbalanced magnetic forces, both static and dynamic. This results in a fully magnetically balanced unit. The balancing reduces losses in parallel connections and damper bars, by reducing thermal loading. This approach also provides a continuous online monitoring system, which may be used for other types of surveillance operations as well. The reduced oscillating forces on the rotor components removes or at least significantly reduces fatigue. THD may also be improved by removing airgap flux irregularities.

The above illustrated embodiments are just non-limiting examples of the implementation of the present technology. Many alternatives in the detailed implementation may be found. Above, the concentrated windings are provided at the rotor. This is a very common design choice and is presently believed to be the preferred choice also for the present technology. However, it is also possible to apply the same ideas on concentrated windings provided at the stator side.

The sensor or sensors used for achieving the parameters, on which the balancing-current controllers base their control operation, may target very different quantities. However, all these parameters are in one way or another, associated with the flux in the airgaps. In a preferred embodiment, at least one sensor is a flux meter, preferably arranged for sensing a magnetic flux in an airgap between a stator and a rotor of the electrical machine in connection with the concentrated windings. Measurements from such a sensor gives a very direct input information about any irregularities in the operation of the electrical machine.

In other words, in one embodiment, at least one sensor is a flux meter.

The sensor may also be responsive to forces between the rotor and stator. The sensors used for providing information about the forces acting on the electrical machine, and in particular the relative force between the stator and rotor, can be of very different types and may be positioned at very different positions. Preferably, more than one sensor is used, also for redundancy reasons. One possible sensor to use is a strain gauge. The sensor(s) is(are) arranged between any part of the stator or any part mechanically attached to the stator, and any part of the rotor or any part mechanically attached to the rotor.

The sensor may also measure the relative position between a shaft of the rotor and the stator. Such a sensor can be provided at very different locations within an electrical motor and can be configured for measuring distances between parts that have a well-defined relation to the shaft and stator, respectively. The relative position is associated with any displacement of the rotor with respect to the stator, which in turn is dependent on the magnetic conditions in the air gap.

The sensor or sensors could also be vibration sensors, monitoring vibrations in the rotor and/or stator or acoustic noise generated by the electrical machine. The vibrations are, possibly both by amplitude and frequency, characteristics influenced by the magnetic balancing of the electrical machine.

Also monitoring of the driving voltage/current and/or generated voltage/current can give information about the balancing conditions within the electrical machine and may be used for purposes of providing the balancing-current controllers with useful information.

With the presented ideas, it is possible to get a technical effect, if only limited, with just one balancing power supply. However, it is preferred to utilize a plurality of them. Thus, in one embodiment, the magnetic flux control system comprises a plurality of balancing power supplies, galvanically isolated from each other as well as from the common main power supply. Each one of the balancing power supplies powers a respective balancing-current controller. The balancing-current controllers are separately controlling currents connected to respective segment of the concentrated windings.

Figure 5:
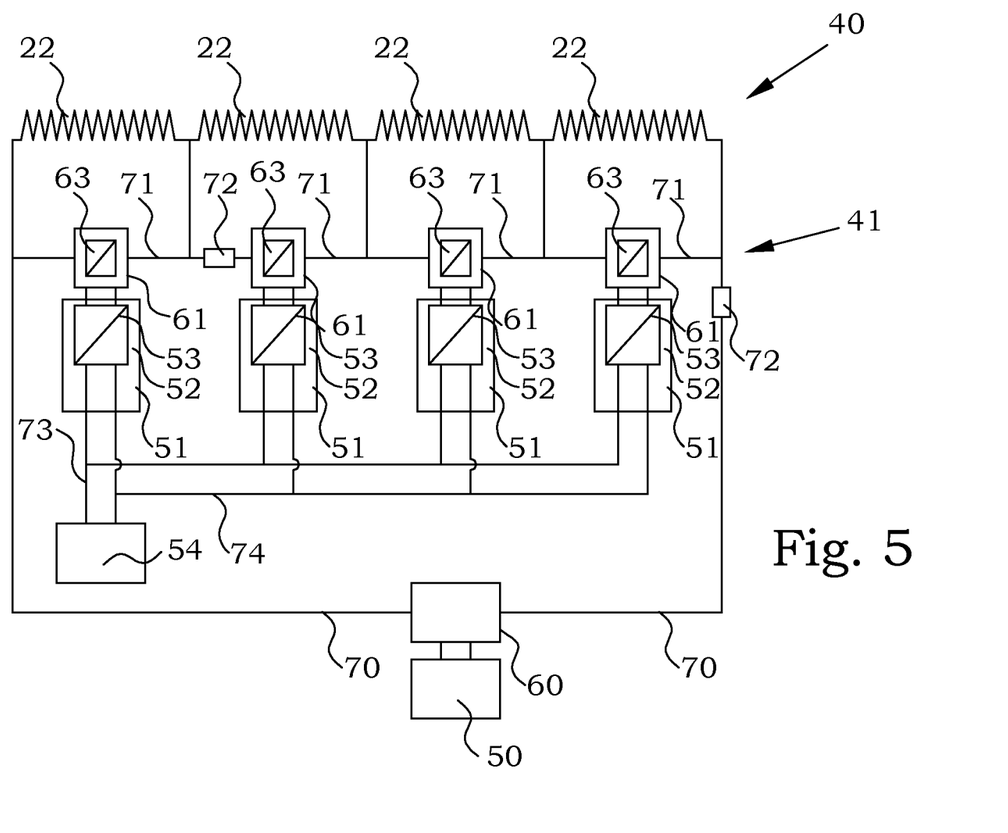
FIG. 5 illustrates a further embodiment of a winding excitation arrangement.

The balancing-current controller may be configured in many different ways. Such controlling of a current based on sensor input is, as such, well-known in prior art and is therefore not discussed in detail. However, one possibility that might be mentioned is to base the controller operation on a voltage source converter 63, as indicated in FIG. 5.

Thus, in one embodiment, at least one balancing-current controller comprises a voltage source converter.

One important feature of the above presented technology is that the balancing power supplies provide galvanic isolation. However, the powering of the balancing power supplies is not necessarily galvanically isolated. One approach is to feed the balancing-current controller from an isolated power supply 52, as is schematically illustrated in FIG. 5. One way to provide the isolated power supply 52 is to equip each balancing power supply 51 with a converter 53 isolating an incoming supply of power from the outgoing supply of power.

Also, in one embodiment, at least one balancing-current controller is fed from an isolated power supply.

In this particular embodiment, the converters 53 are fed from a dc voltage source 54. The isolated power supply 52 comprises thus in the present embodiment a dc/dc voltage-sourced converter. Depending on the available dc voltage source 54, the dc/dc voltage-sourced converter may have different converter ratios, i.e. a converter ratio of less than 1, equal to 1 or more than 1.

A ballast impedance 72A is connected in series with the concentrated windings 22. This ballast impedance may be a separate ballast impedance or a section of the concentrated windings themselves. In the present embodiment, a ballast impedance 72B is also illustrated in the magnetic flux control system 41, as described before. Preferably, at least one, but possible more than one ballast impedance 72A in in series with the concentrated windings 22 and one or more ballast impedances in the magnetic flux control system 41 is provided.

Figure 6:
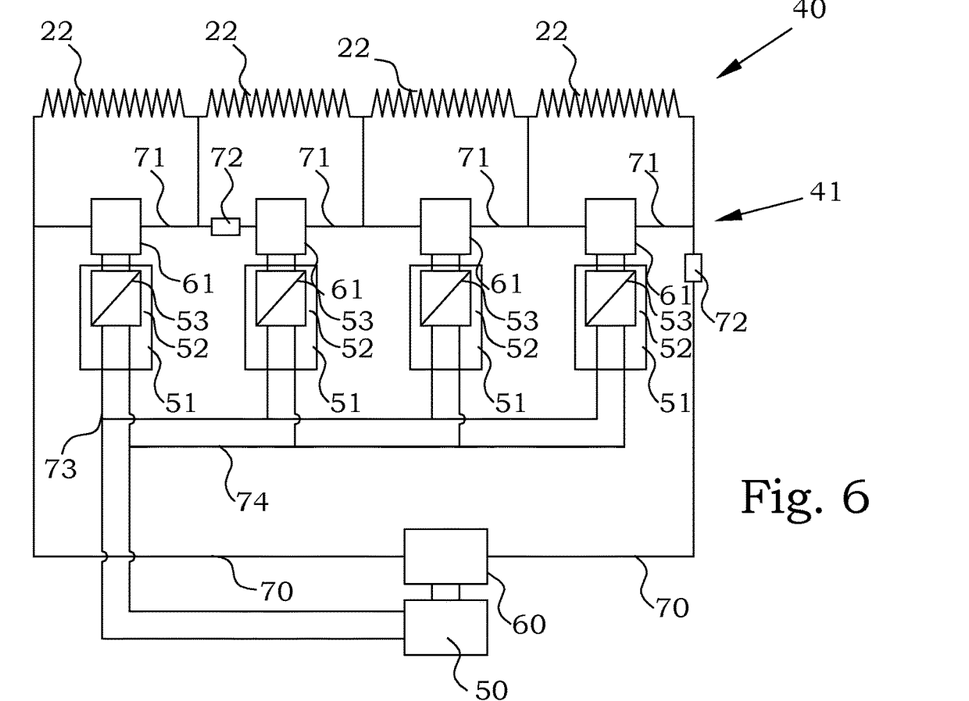
FIG. 6 illustrates another embodiment of a winding excitation arrangement.

FIG. 6 illustrates another embodiment of a winding excitation arrangement 40, in which the isolated power supplies 52 are powered by the common main power supply 50. The converters 53, also in this particular embodiment, isolate the incoming supply of power from the outgoing supply of power. However, in alternative embodiments, the isolation may be provided in other ways.

Figure 7:
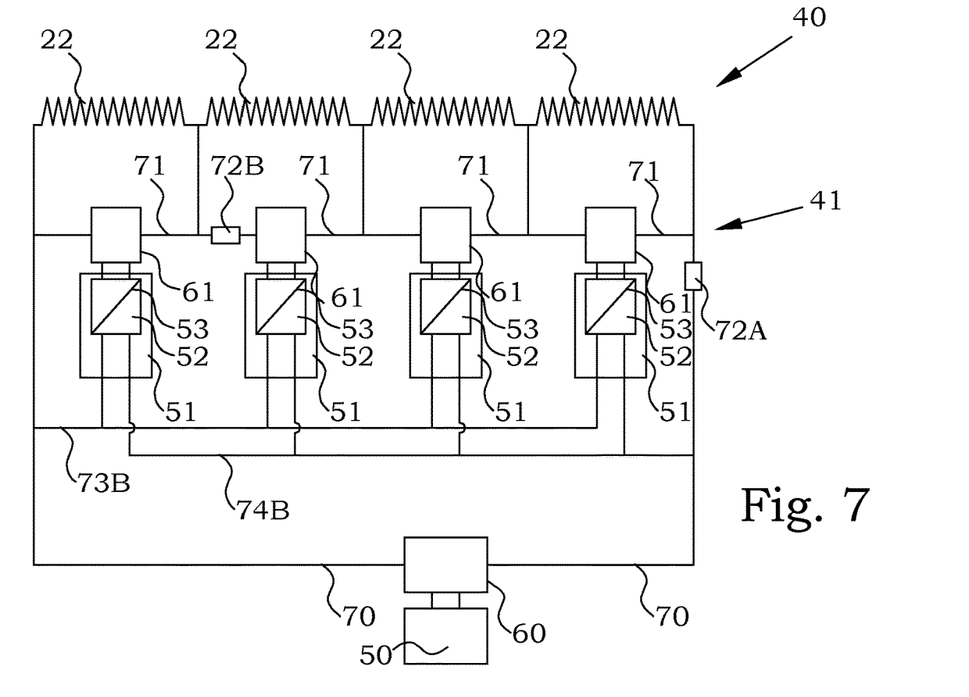
FIG. 7 illustrates yet another embodiment of a winding excitation arrangement.

FIG. 7 illustrates a further embodiment of a winding excitation arrangement 40. Here, the isolated power supplies 52 have supply connections 73B, 74B configured for allowing to be connected over a part of the concentrated windings 22. This part of the concentrated windings may be anything between all concentrated windings to a single one of the concentrated windings.

In the present embodiment, the supply connections 73B, 74B are connected over all the concentrated windings 22. Expressed in different words, in the winding excitation arrangement 40, at least one balancing power supply 51 is supplied by power from an output 70 of the main power supply 50, directly or via the main controller 60, as in the figure.

In applications where the concentrated windings 22 are provided at the rotor, the main power for the concentrated windings provided through the main electrical connections may be provided from the static side of the machine, e.g. via an ac/dc converter. The isolated power supplies 52 may then be powered by a connection to the same main electrical connections. No separate transfer between the static and rotating part is thus necessary. This embodiment is very advantageous, in particular for synchronous machines.

In further alternative embodiments, the isolated power supply may be an ac/dc power supply.

The alternating current can be provided in different ways. In many applications, also the common main power supply is fed from an alternating current source. In such applications, it may therefore be beneficial to connect the magnetic balancing power supplies to the same source.

In other words, in one embodiment, the ac/dc power supply has supply connections configured for allowing to be connected to a same power source as for the common main power supply.

As was discussed further above, by selecting the magnitudes of the outputs from the common main power supply and the magnetic balancing-current controllers in specific relations, the magnetic balancing current may be ensured to be provided using a unidirectional isolated power supply. The magnetic balancing current is then contributing to the mean basic magnetization of the concentrated windings.

It is preferred if these different contributions cooperate. This means that the balancing-current controller preferably is configured to control a current only in a same direction as a current from the common main power supply flowing through all the concentrated windings.

In cases where the magnetic balancing current assists in providing the basic magnetization, the balancing-current controller is configured to control a continuous current, powered by the balancing power supply (supplies), to flow through the segment.

It is thus presently believed that it is an advantage that the current from the balancing-current controllers to some extent contribute to the basic magnetization. However, in order to reduce the technical demands on the balancing power supplies and balancing-current controllers, this contribution is preferably kept rather limited. In one embodiment, the at least one balancing-current controller has an average current output that is less than 20%, preferably less than 10%, of a current from an output of the main current controller.

In alternative embodiments, the isolated power supply may also be bidirectional, which typically permits a further reduction of the average current output from the balancing-current controllers.

As mentioned above, the provision of a single balancing-current controller may assist in reducing unbalances and vibrations to some extent. However, in order to have a better compensation, a plurality of balancing-current supplies is preferred. In other words, a preferred embodiment of the magnetic flux control system comprises a plurality of balancing power supplies, galvanically isolated from each other as well as from the common main power supply. Each one of the balancing power supplies powers a respective balancing-current controller. The balancing-current controllers are separately controlling currents connected to respective segment of the concentrated windings.

Figure 8A:
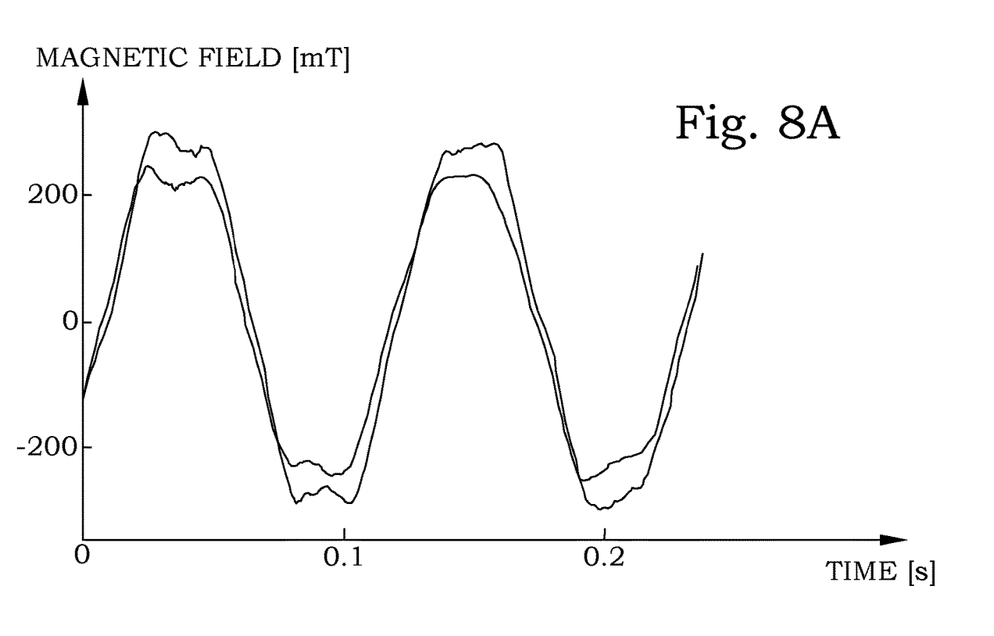
FIG. 8A is a time diagram illustrating flux variations in an electrical machine with eccentric rotor and stator.

Laboratory tests have been performed for proving the capability of the proposed technology. A machine having a heavily eccentric stator and rotor was used as a test object. In FIG. 8A, a time variation of the magnetic field at two positions in the airgap associated with concentrated windings are illustrated. The windings were fed with a common basic magnetization current, equal in each winding. The variations indicated the existence of an eccentric machine causing forces between the stator and rotor.

Figure 8B:
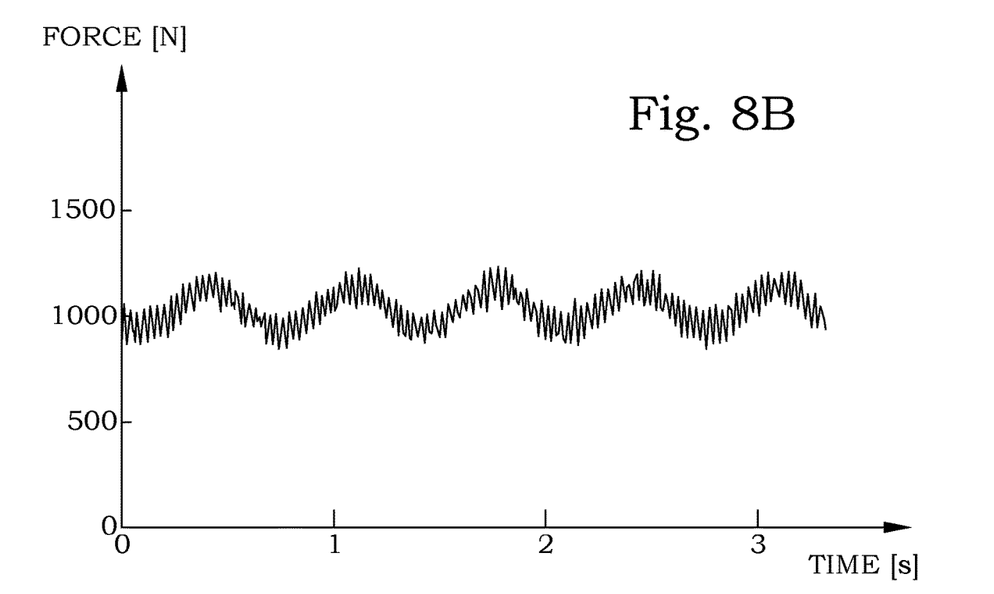
FIG. 8B is a time diagram illustrating forces in an electrical machine with eccentric rotor and stator without magnetic balancing.

The excitation was then changed into a combination of a main power supply providing half the requested magnetization current and three isolated magnetic balancing-current controllers connected in parallel over different sections of the concentrated windings providing the second half of the requested magnetization current. The three isolated magnetic balancing-current controllers were first arranged to provide constant currents, and the results were indeed very similar to the ones illustrated in FIG. 8A. A net force between the stator and the rotor was measured, and the result is shown in the diagram of FIG. 8B. As expected, a considerable and fluctuating force was present, causing wear and vibrations.

Figure 8C:
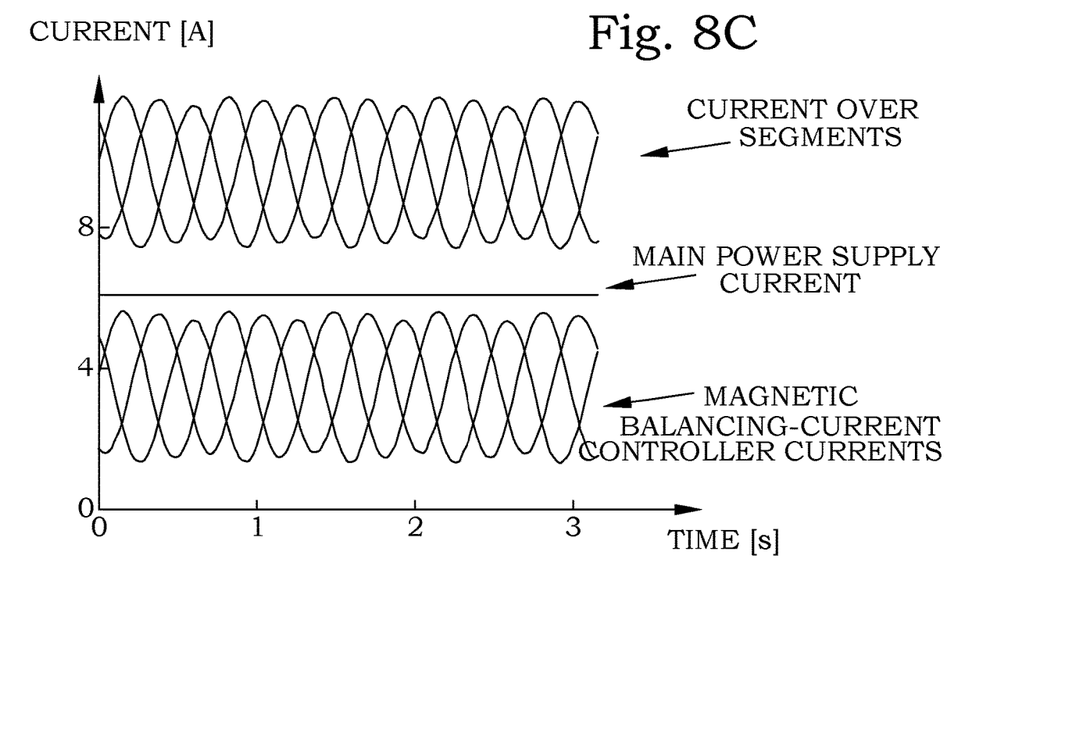
FIG. 8C is a time diagram of applied currents in the rotor of an electrical machine with eccentric rotor and stator with magnetic compensation.
Figure 8D:
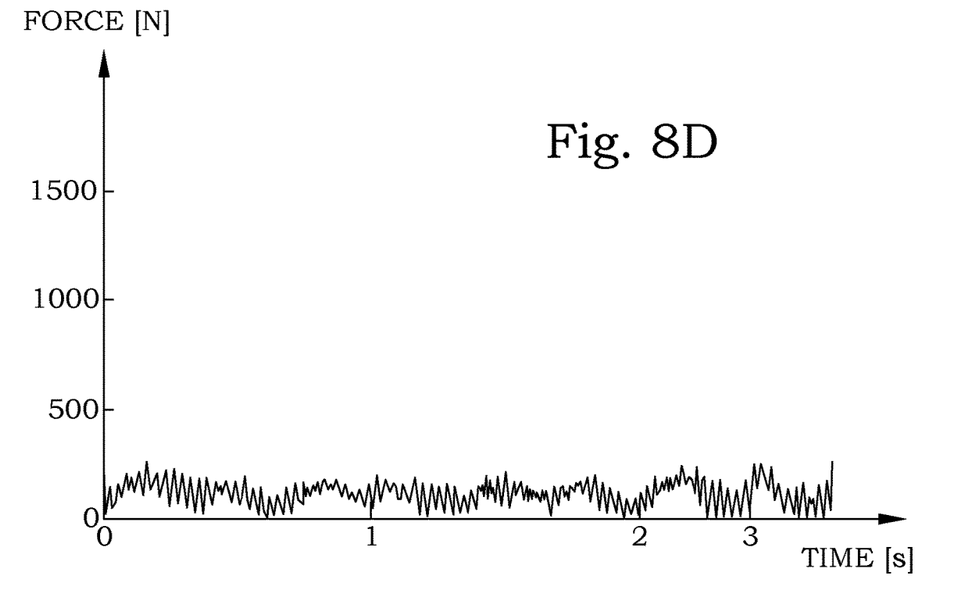
FIG. 8D is a time diagram illustrating forces in an electrical machine with eccentric rotor and stator with magnetic balancing.

The three isolated magnetic balancing-current controllers were then operated based on measured magnetic fluxes associated with the concentrated windings, to compensate for eccentric motions. The constant current from the main power supply and the different currents provided from the three isolated magnetic balancing-current controllers are illustrated in FIG. 8C, together with the total current of the different segments of concentrated windings. This operation significantly reduced the variation in flux between the different concentrated windings. Also the net force between the stator and the rotor was significantly reduced, as illustrated in FIG. 8D. Note that the eccentricity of this test equipment was much larger than normally found in typical operating machines, which required higher magnetic balancing currents than normal. As mentioned before, an average current output of a magnetic balancing-current supply is typically less than 20%, preferably less than 10%, of a current from an output of the main current controller.

Figure 9:
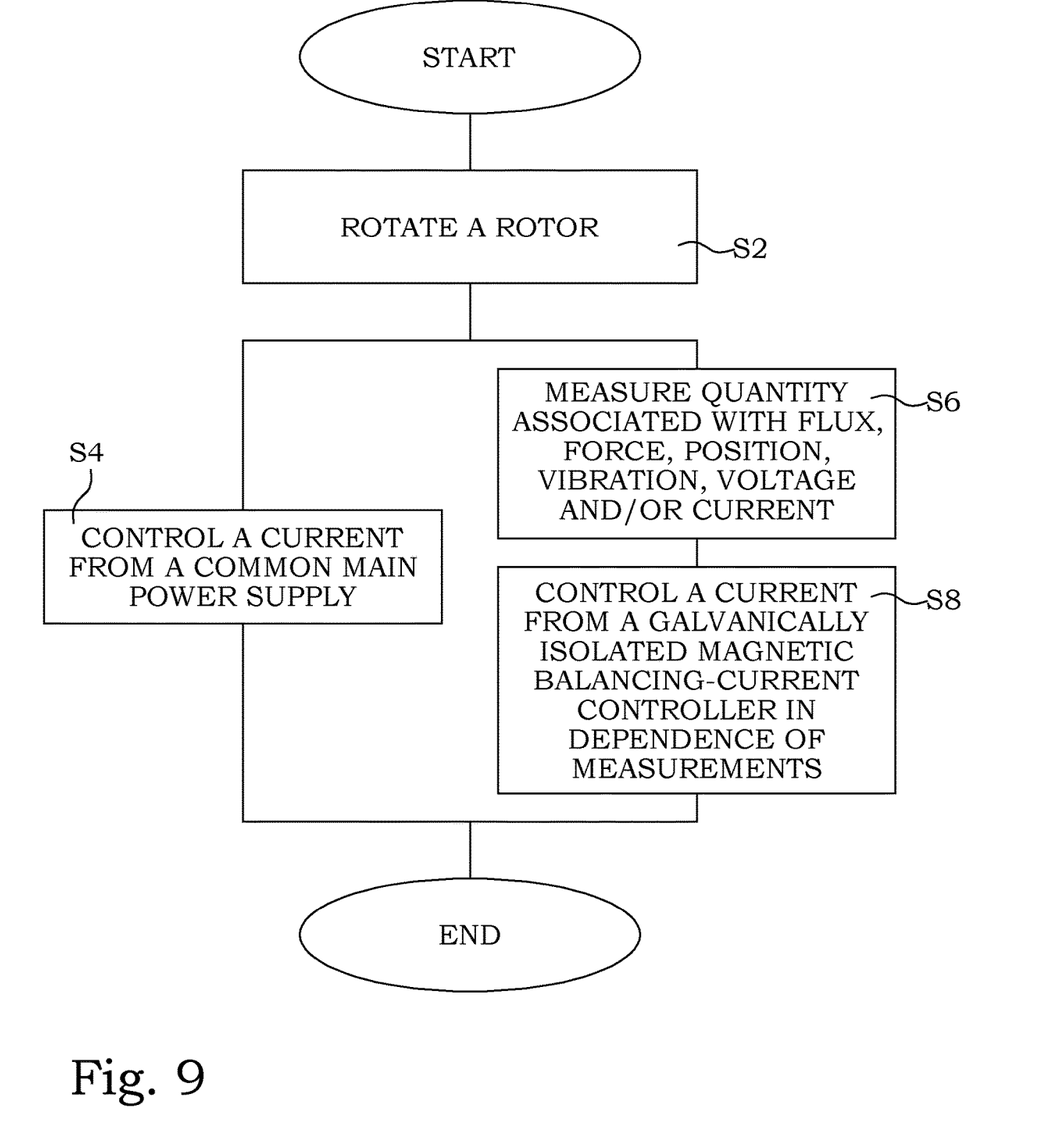
FIG. 9 is a flow diagram of steps of an embodiment of a method for controlling the magnetic flux in an electrical machine with concentrated windings.

FIG. 9 illustrates a flow diagram of steps of an embodiment of a method for controlling the magnetic flux in an electrical machine with concentrated windings, all connected in series and supplied by a common main power supply. In step S2, a rotor of the electrical machine is rotated relative a stator of the electrical machine. In step S4, a current from the common main power supply supplied through the serially connected concentrated windings is controlled. In step S6, a quantity is measured. The quantity is associated with a flux in an airgap between a stator and a rotor of the electrical machine in connection with the concentrated windings, a force between the rotor and the stator, a position of a shaft of the rotor relative the stator, vibrations in the rotor, vibrations in the stator, acoustic noise generated by the electrical machine, voltage generated by or supplied to the electrical machine and/or currents generated by or supplied to the electrical machine. In step S8, powered from a galvanically isolated magnetic balancing power supply, at least one current supplied through a segment of the concentrated windings is controlled in dependence of the measured quantity. The segment is less than the entirety of the concentrated windings.

It can be noted that step S4 is not dependent on step S8, which means that if the control of the magnetic balancing-current supplies will fail, the main control of step S4 will still be operable.

The present technology has a number of attractive features. As mentioned above, failures create no harm to existing components. Installation in already existing equipment is simple and not very intrusive. The operation of the magnetic balancing-current supplies removes all unbalanced magnetic forces, both static and dynamic. The operation also reduces losses in parallel stator circuits and damper bars, i.e. thermal loading is reduced. The technology also offers a continuous online monitoring system. The removal of the unbalanced magnetic forces consequently removes or at least significantly reduces fatigue from oscillating forces on rotor components. The technology also improves THD by removing airgap flux irregularities.

The embodiments described above are to be understood as a few illustrative examples of the present invention. It will be understood by those skilled in the art that various modifications, combinations, and changes may be made to the embodiments without departing from the scope of the present invention. In particular, different parts of the solutions in the different embodiments can be combined in other configurations, where technically possible. The scope of the present invention is, however, fully defined by the appended claims.

The invention claimed is:

1. A magnetic flux control system for controlling the magnetic flux in an electrical machine with concentrated windings, all connected in series and supplied by a common main power supply, said magnetic flux control system comprising:
   at least one magnetic balancing power supply;
   at least one balancing-current controller, powered by a respective one of said at least one magnetic balancing power supply;
   electrical connections configured to permit the connection of an output of said at least one balancing-current controller over a segment of said concentrated windings;
   said segment being less than the entirety of said concentrated windings;
   wherein said at least one magnetic balancing power supply provides galvanic isolation;
   at least one sensor configured to measure a parameter associated with at least one of:
      magnetic flux in an airgap between a stator and a rotor of said electrical machine in connection with said concentrated windings;
      force between said rotor and said stator;
      position of a shaft of said rotor relative said stator;
      vibrations in said rotor;
      vibrations in said stator;
      acoustic noise generated by said electrical machine;

voltages generated by or supplied to said electrical machine; and currents generated by or supplied to said electrical machine; and said at least one balancing-current controller being connected to said at least one sensor;

wherein each of said at least one balancing-current controller is configured to control a current, powered by said at least one magnetic balancing power supply, in dependence of a signal representing said measured parameter of said at least one sensor.

2. The magnetic flux control system according to claim 1, further comprising a ballast impedance connected in series between said at least one balancing-current controller and said segment.

3. The magnetic flux control system according to claim 1, wherein said at least one balancing-current controller comprises a voltage source converter.

4. The magnetic flux control system according to claim 1, wherein said balancing-current controller is configured to control a current only in a same direction as a current from said common main power supply flowing through all said concentrated windings.

5. The magnetic flux control system according to claim 1, further comprising a plurality of balancing power supplies, each one of said balancing power supplies providing galvanic isolation and powering a respective said balancing-current controller, said balancing-current controllers separately controlling currents connected to respective segment of said concentrated windings.

6. A winding excitation arrangement for an electrical machine with concentrated windings, all connected in series, said winding excitation arrangement comprising:

a main power supply;

a main controller, configured for controlling an output from said main power supply;

main electrical connections configured to permit the connection of said main controller to said concentrated windings; and a magnetic flux control system according to claim 1.

7. The magnetic flux control system according to claim 3, wherein said at least one balancing-current controller is fed from an isolated power supply.

8. The magnetic flux control system according to claim 4, wherein said balancing-current controller is configured to control a continuous current to flow through said segment.

9. The winding excitation arrangement according to claim 6, further comprising at least one ballast impedance connected in series with said concentrated windings.

10. The winding excitation arrangement according to claim 6, wherein said at least one magnetic balancing power supply is supplied by power from an output of said main power supply.

11. The winding excitation arrangement according to claim 6, wherein said at least one balancing-current controller has an average current output that is less than 20%, preferably less than 10%, of a current from an output of said main controller.

12. An electrical machine comprising:

a rotor;

a stator;

concentrated windings connected in series; and a winding excitation arrangement according to claim 6.

13. The magnetic flux control system according to claim 7, wherein said isolated power supply has supply connections configured for allowing to be connected to an output of said common main power supply.

14. The magnetic flux control system according to claim 7, wherein said isolated power supply has supply connections configured for allowing to be connected over at least a part of said concentrated windings.

15. The magnetic flux control system according to claim 7, wherein said isolated power supply is an ac/dc power supply, wherein said ac/dc power supply has supply connections configured for allowing to be connected to a same power source as for said common main power supply.

16. The magnetic flux control system according to claim 7, wherein said isolated power supply is unidirectional.

17. The magnetic flux control system according to claim 7, wherein said isolated power supply is bidirectional.

18. The electrical machine according to claim 12, wherein said concentrated windings are provided at said rotor.

19. The electrical machine according to claim 12, wherein said concentrated windings are provided at said stator.

20. A method for controlling the magnetic flux in an electrical machine with concentrated windings, all connected in series and supplied by a common main power supply, comprising the steps of:

rotating a rotor of said electrical machine relative a stator of said electrical machine;

controlling a current via a current controller through said serially connected concentrated windings; and measuring a quantity being associated with at least one of:

a flux in an airgap between said stator and said rotor in connection with said concentrated windings;

a force between said rotor and said stator;

a position of a shaft of said rotor relative said stator;

vibrations in said rotor;

vibrations in said stator;

acoustic noise generated by said electrical machine;

voltage generated by or supplied to said electrical machine; and currents generated by or supplied to said electrical machine; and controlling, powered from a galvanically isolated magnetic balancing power supply, at least one current supplied through a segment of said concentrated windings in dependence of said measured quantity;

said segment being less than the entirety of said concentrated windings.

* * * * *

UNITED STATES PATENT AND TRADEMARK OFFICE
CERTIFICATE OF CORRECTION

PATENT NO. : 12,483,172 B2  
APPLICATION NO. : 18/686541  
DATED : November 25, 2025  
INVENTOR(S) : José Perez-Loya et al.

Page 1 of 1

It is certified that error appears in the above-identified patent and that said Letters Patent is hereby corrected as shown below:

On the Title Page

Item (73)  
Assignee: replace "*Magstöm AB*" with "*Magström AB*"

Signed and Sealed this  
Sixth Day of January, 2026

John A. Squires  
*Director of the United States Patent and Trademark Office*